United States Patent [19]

Sorioka

[11] Patent Number: 4,595,448
[45] Date of Patent: Jun. 17, 1986

[54] TIRE BUILDING APPARATUS

[75] Inventor: Michitoshi Sorioka, Higashiyamato, Japan

[73] Assignee: Bridgestone Tire Company Limited, Tokyo, Japan

[21] Appl. No.: 551,688

[22] Filed: Nov. 14, 1983

[30] Foreign Application Priority Data

Nov. 19, 1982 [JP] Japan .................................. 57-203860

[51] Int. Cl.⁴ .......................................... B29D 30/00
[52] U.S. Cl. ................................ 156/396; 156/406.2; 156/406.4; 156/416; 156/293; 156/126; 156/244.13; 156/244.15; 156/244.25
[58] Field of Search ....................... 156/110.1, 115, 118, 156/125, 126–127, 133–134, 156, 244.13, 244.14, 244.15, 244.19, 244.21, 244.22, 245.25, 293–295, 394.1, 395–396, 406.2, 406.4, 416; 152/330 R

[56] References Cited

U.S. PATENT DOCUMENTS

| Re. 28,600 | 11/1975 | Lemelson | 425/465 |
|---|---|---|---|
| 2,614,056 | 10/1952 | Kraft | 425/90 |
| 2,771,936 | 11/1956 | Iknayan et al. | 425/115 |
| 2,897,540 | 8/1959 | Rhodes | 425/112 |
| 3,143,449 | 8/1964 | Bosomworth et al. | 156/126 |
| 3,192,087 | 6/1965 | Close et al. | 156/126 |
| 3,587,281 | 6/1971 | Lemelson | 425/465 |
| 3,615,987 | 10/1971 | Blatz et al. | 156/133 |
| 3,676,028 | 7/1972 | Christie et al. | 425/38 |
| 3,948,304 | 4/1976 | Mirtain | 156/110.1 |
| 4,198,367 | 4/1980 | Burrell | 156/110.1 |
| 4,283,241 | 8/1981 | Hollmann | 156/117 |
| 4,484,966 | 11/1984 | Kawamoto | 156/117 |

FOREIGN PATENT DOCUMENTS

| 560319 | 7/1958 | Canada | 156/125 |
|---|---|---|---|
| 55-37420 | 9/1980 | Japan . | |

Primary Examiner—Lois E. Boland
Attorney, Agent, or Firm—Cushman, Darby & Cushman

[57] ABSTRACT

A tire building apparatus comprising: an extruder having an extrusion die comprising a doughnut-shaped die member and an axially elongated die member to provide for consecutively extruding a cylindrical-shaped material downwardly from space between the doughnut-shaped die member and the axially elongated die member; a tire supporting unit for supporting a green tire into which the cylindrical-shaped material is to be inserted; an expanding unit adapted to hold the cylindrical-shaped material from the inside of the green tire and to expand radially and outwardly the cylindrical-shaped material to bond to an inner surface of the green tire; a severing assembly on the tire supporting unit for severing to a predetermined length the cylindrical-shaped material inserted into the green tire; and a drive unit adapted to drive the tire supporting unit to move with respect to the extruder.

8 Claims, 10 Drawing Figures

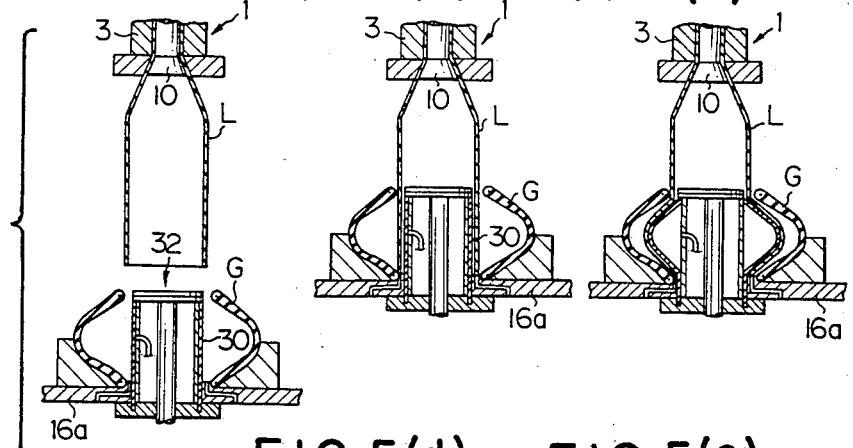
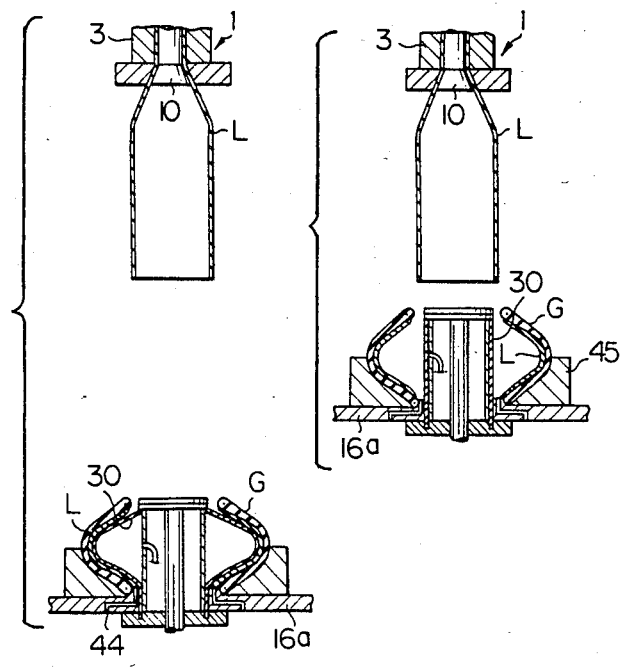
FIG. 5(a) FIG. 5(b) FIG. 5(c) FIG. 5(d) FIG. 5(e)

TIRE BUILDING APPARATUS

FIELD OF THE INVENTION

The present invention relates to a tire building apparatus for bonding a cylindrical-shaped material such as an inner liner to an inner surface of a green tire to build a pneumatic tire.

SUMMARY OF THE INVENTION

In accordance with one important aspect the present invention, there is provided a tire building apparatus comprising: an extruder having an extrusion die comprising a doughnut-shaped die member and an axially elongated die member to provide for consecutively extruding a cylindrical-shaped material downwardly from space between the doughnut-shaped die member and the axially elongated die member; tire supporting means positioned under the extruder and for supporting a green tire into which the cylindrical-shaped material is to be inserted the supporting means being movable toward and away from the extruder and being revolvable in a horizontal plane with respect to the extruder; expanding means mounted on the tire supporting means and adapted to hold the cylindrical-shaped material from the inside of the green tire and to expand radially and outwardly the cylindrical-shaped material to bond to an inner surface of the green tire; a severing assembly mounted on the tire supporting means and for severing to a predetermined length the cylindrical-shaped material inserted into the green tire; and drive means adapted to drive the tire supporting means to move with respect to the extruder.

In accordance with another important aspect of the present invention, there is provided a tire building apparatus comprising: an extruder having an extrusion die comprising a doughnut-shaped die member and an axially elongated die member to provide for consecutively extruding a cylindrical-shaped material downwardly from space between the doughnut-shaped die member and the axially elongated die member; tire supporting means for supporting a green tire into which the cylindrical-shaped material is to be inserted; expanding means adapted to hold the cylindrical-shaped material from the inside of the green tire and to expand radially and outwardly the cylindrical-shaped material to bond to an inner surface of the green tire; a severing assembly for severing to a predetermined length the cylindrical-shaped material inserted into the green tire; and drive means adapted to drive the doughnut-shaped die member, the axially elongated die member and the expanding means, the severing assembly to relatively move each other; space adjusting means which is adapted to adjust or change a space defined by the doughnut-shaped die member and the elongated die member by moving the elongated die member upwardly and downwardly with respect to the doughnut-shaped die member in such a manner that thickness in an axial direction of the cylindrical-shaped material is adjusted or changed; and a holder member provided on the tire supporting means and adapted to support and maintain the green tire to be a substantially toroidal shape.

DESCRIPTION OF THE PRIOR ART

In a prior-art tire building apparatus, an inner liner of a ribbon-like rubber material which is severed into a predetermined length is applied around a tire building drum by a servicer and then jointed at its longitudinal opposite ends. Thereafter, ribbon-like rubber materials for carcass and belt plies are in the same manner applied around the tire building drum and jointed to build a pneumatic tire. Thus, such ribbon-like material is required to be jointed at its longitudinal opposite ends to form the inner liner forming part of the pneumatic tire. For this reason, a drawback has been encountered that defective joints occur in a vulcanized tire. Further, the ribbon-like rubber material is rolled and stocked for a long period after it is extruded by an extruder or a calender roll. This lowers adhesive force of the ribbon-like rubber material and results in reduction in joint strength of the opposite ends of the rubber material. Furthermore, additional stock and space are required by the reason that the ribbon-like material is rolled and stocked for a long period, and are further required in case that tires are the same in rim radius but different in size.

The present invention contemplates provision of a tire building apparatus for bonding a cylindrical-shaped material such as an inner liner to an inner surface of a green tire to build a pneumatic tire, eliminating all the above described problems that have thus far been inherent in the prior-art tire building apparatus.

It is, accordingly an important object of the present invention to provide an improved tire building apparatus in which the inner liner is manufactured without having a joint portion and bonded to the inner surface of the green tire without the stock of the inner liner.

BRIEF DESCRIPTION OF THE DRAWING

The features and advantages of a tire building apparatus according to the present invention will be more clearly understood from the following description taken in conjunction with the accompanying drawings in which:

FIGS. 5(*a*), (*b*), (*c*), (*d*) and (*e*) are fragmentary vertical cross sectional views showing stages of an example of the tire building process according to the present invention.

DESCRIPTION OF THE PREFERRED EMBODIMENTS

Figure 1:
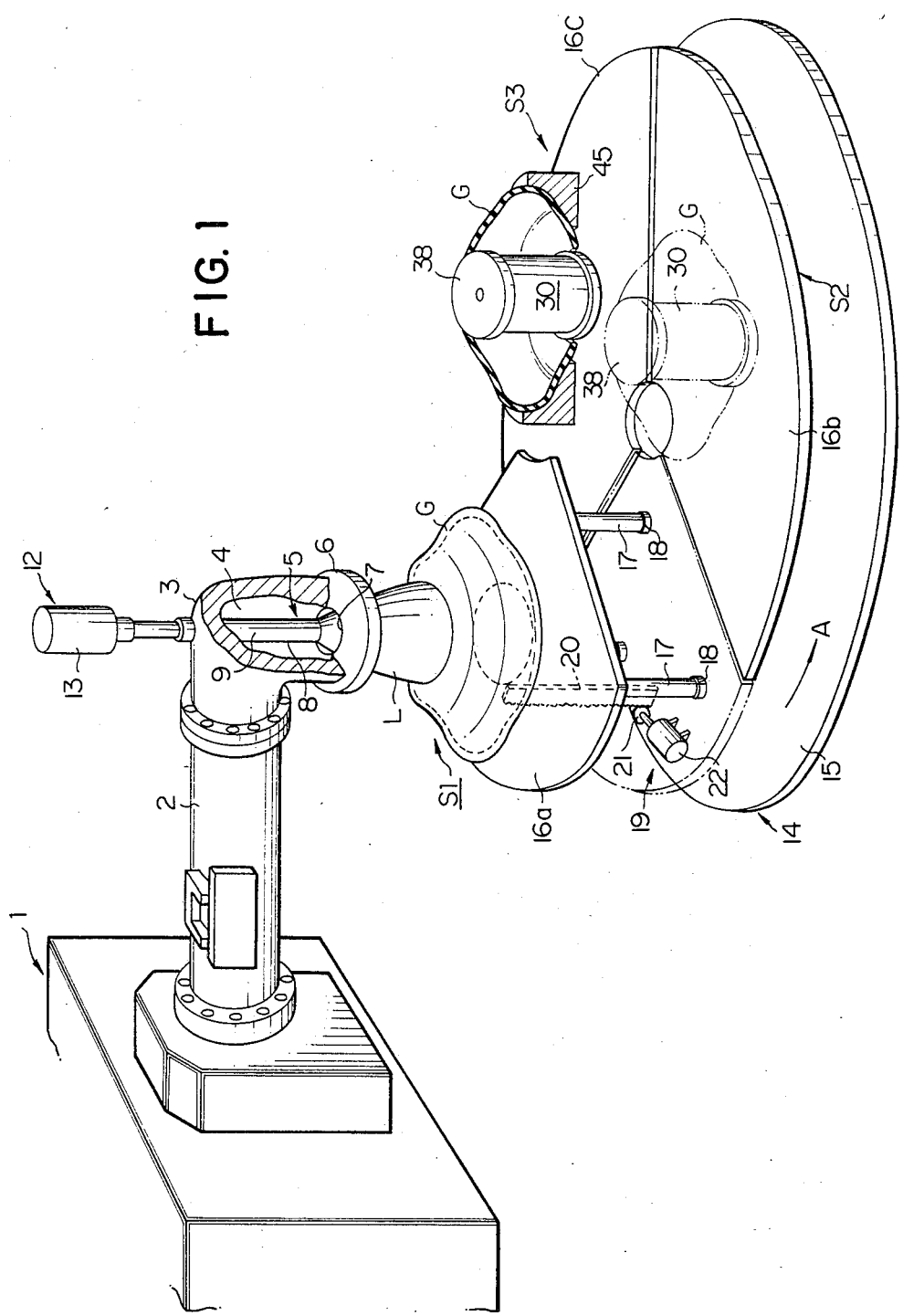
FIG. 1 is a schematic view showing arrangements of the tire building apparatus according to the present invention.
Figure 2:
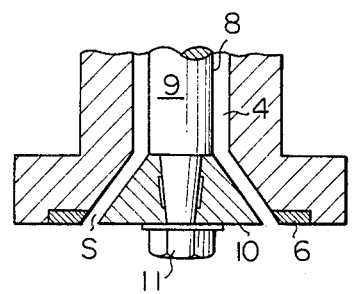
FIG. 2 is a fragmentary cross sectional view showing, to an enlarged scale, portions of an extrusion die illustrated in FIG. 1.

Referring now more specifically to FIG. 1 of the drawings, a first preferred embodiment of the tire building apparatus according to the present invention is shown which comprises an extruder generally designated by the reference numeral 1 for extruding consecutively a cylindrical-shaped inner liner L formed of a suitable resilient material such as rubber. The extruder 1 has connected thereto an axially elongated extrusion cylinder 2 with which one end flange portion of an extrusion bend 3 is interchangeably connected by means of a plurality of suitable fastening members not shown. The extrusion bend 3 has formed therein an inverted L-shaped extrusion passageway 4 for receiving therein an extrusion die 5 comprising a doughnut-shaped die member 6 securely mounted on the other end portion of the extrusion bend 3 and formed with an opening 7 to which the extrusion passageway 4 is open. In FIG. 2, the extrusion die 5 further comprises an axially elongated die member 8 having an elongated shank portion 9 which is secured at its downward end with a frusto-conical end head portion 10 by a bolt 11 to provide for consecutively extruding the cylindrical-shaped inner liner L downwardly from a doughnut-shaped space S defined by the frusto-conical end head portion 10 of the elongated die member 8 and the doughnut-shaped die member 6 formed with the opening 7.

Referring again to FIG. 1, the tire building apparatus further comprises space adjusting means generally designated by the reference numeral 12 which is adapted to adjust or change the doughnut-shaped space S defined by the frusto-conical end head portion 10 of the elongated die member 8 and the doughnut-shaped die member 6. The space adjusting means 12 comprises a parison controller 13 having an axially movable shaft not shown drivably connected with the elongated shank portion 9 of the elongated die member 8. It is thus to be understood that the thickness in the axial direction of the extruded cylindrical-shaped inner liner L may be quickly adjusted or changed by moving the shaft of the parison controller 13 axially upwardly and downwardly. Tire supporting means generally designated by the reference numeral 14 forming part of the tire building apparatus is adapted to support a green tire G into which the cylindrical-shaped inner liner L is to be inserted, and positioned directly under the extrusion bend 3 of the extruder 1. The tire supporting means 14 comprises a horizontally revolvable lower circular plate 15, and upper vertically movable fan-shaped members 16a, 16b and 16c as tire supporting tables which are respectively disposed in opposite and alignedly spaced relation with the lower circular plate 15. The horizontally revolvable lower circular plate 15 is intermittently 120 degrees revolvable in a horizontal plane. On the lower surface of each of the movable fan-shaped members 16a, 16b and 16c are rigidly mounted the upper ends of a plurality of guide rods 17 each of which is slidably received in a plurality of apertures 18 formed in the lower circular plate 15. Drive means generally designated by the reference numeral 19 forming part of the tire building apparatus is mounted on the lower circular plate 15 of the tire supporting means 14, and is adapted to drive a bladder and a severing assembly, which will be explained as the description procedes, to move toward and away from the doughnut-shaped die member 6 and the elongated die member 8 of the extruder 1. The drive means 19 comprises a plurality of vertical racks 20 the upper ends of which are rigidly mounted on each of the lower surfaces of the vertically movable fan-shaped members 16a, 16b and 16c at the centers of the gravities of the movable fan-shaped members 16a, 16b and 16c and which passes through the lower circular plate 15, a plurality of pinion gears 21 held in meshing engagement with the vertical racks 20 and a plurality of reversible pulse motors 22 mounted on the lower circular plate 15 and carrying the pinion gears 21 thereon.

Figure 3:
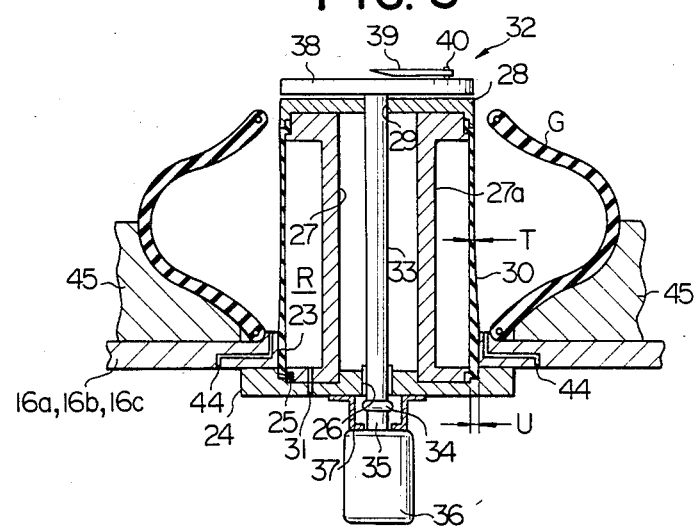
FIG. 3 is a fragmentary cross sectional view showing, to an enlarged scale, a severing assembly and expanding means which are employed in a first preferred embodiment of the tire building apparatus according to the present invention.

In FIG. 3, each of the vertically movable fan-shaped members 16a, 16b and 16c has formed therein an opening 23 passing therethrough and secured thereto at its lower surface a holder plate 24 covering the opening 23. The holder plate 24 is provided with a circular recess 25 substantially equal in size to the opening 23 and with a circular bore 26 passing through the holder plate 24. A cylindrical structure 27 is securely mounted on the circular recess 25 of the holder plate 24 past the opening 23. On the upper face of the cylindrical structure 27 is rigidly mounted a cover plate 28 formed with a circular bore 29 disposed in vertical alignment with the circular bore 26 of the holder plate 24. A bladder 30 formed of resilient material and serving as expanding means is provided to hermetically seal an externally grooved portion 27a of the cylindrical structure 27, and the upper end of which is hermetically held between by a lower flange portion of the cover plate 28 and an upper end recess portion of the cylindrical structure 27, and the lower end of which is hermetically held between the circular recess 25 of the holder plate 24 and a lower end recess portion of the cylindrical structure 27. It is thus to be understood that a hermetically sealed space R is formed between the cylindrical structure 27 and the bladder 30. The bladder 30 comprises axially opposite end portion having a thickness U and an axially mid portion having a thickness T which is thinner than the thickness U, in order to be expanded from the axially mid portion when fluid under pressure is introduced in hermetically sealed space R formed between the cylindrical structure 27 and the bladder 30. The expanding means comprising the bladder 30 thus constructed and arranged is adapted to support from inside of the green tire G the cylindrical-shaped inner liner L inserted into the green tire G, and expand radially and outwardly the cylindrical-shaped inner liner L to be bonded with an inner surface of the green tire G. The above-noted holder plate 24 is further provided with a fluid passageway 31 to provide for fluid communication between the hermetically sealed space R and a fluid source not shown.

The tire building apparatus further comprises a severing assembly generally indicated by the reference numeral 32 for severing to a predetermined length the cylindrical-shaped inner liner L inserted into the green tire G. The severing assembly 32 comprises a rotatable shaft 33 which is rotatably received at its upper end portion in the circular bore 29 of the cover plate 28 and at its lower end portion in the circular bore 26 of the holder plate 24. The lower end of the rotatable shaft 33 is drivably connected through a coupling member 34 with an output shaft 35 of a drive motor 36 which is secured to the lower surface of the holder plate 24 through a bracket member 37. The severing assembly 32 further comprises a rotatable circular plate 38 the lower surface of which is rigidly mounted on the upper end face of the rotatable shaft 33, and a pivotable cutter 39 pivotably mounted through a pivot pin 40 on the upper surface of the rotatable circular plate 38.

Figure 4:
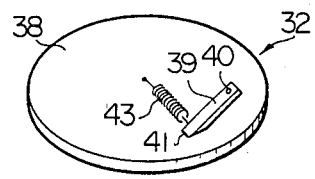
FIG. 4 is a schematic view showing arrangements of the severing assembly illustrated in FIG. 3.

In FIG. 4, the pivotable cutter 39 forming part of the severing assembly has a blade portion 41 for severing the cylindrical-shaped inner liner L and which is urged radially and inwardly of the rotatable circular plate 38 by means of a tension coil spring 43.

Referring again to FIG. 3, an air passageway indicated by the reference numeral 44 is provided in each of the vertically movable fan-shaped members 16a, 16b and 16c to flow out air between the green tire G and the bladder 30. A holder member indicated by the reference numeral 45 is provided on each of the movable fan-shaped members 16a, 16b and 16c to support and maintain the green tire G to be a substantially toroidal shape.

Operation of the tire building apparatus thus constructed and arranged will be described in detail hereinafter.

In primary stage, the green tire G in the form of a substantially toroidal shape is positioned to surround the bladder 30 right under the extrusion bend 3 of the extruder 1 at a first stage S1 as shown in FIG. 1. At this time, the green tire G is maintained to be a substantially toroidal shape by means of the holder member 45. A second stage S2 is in a position which is 120 degrees revolved from the first stage S1 in a direction indicated by an arrow A as shown in FIG. 1, in which the green tire G bonded with the cylindrical-shaped inner liner L is removed therefrom by means of a suitable means. In the second stage S2 shown in FIG. 1, the green tire G is already removed from the fan-shaped member 16b which is now located therein. A third stage S3 is in a position which is 120 degrees revolved from the first stage S2 in a direction indicated by the arrow A as shown in FIG. 1, in which the green tire G is placed thereon by means of a suitable means. In the third stage S3 shown in FIG. 1, the green tire G to which the cylindrical-shaped inner liner L is next bonded is placed on the fan-shaped member 16c which is now located therein. At this time, the cylindrical-shaped inner liner L is consecutively extruded from the space S between the elongated die member 8 and the doughnut-shaped die member 6 of the extruder 1 as shown in FIG. 5(a), the thickness of the cylindrical-shaped inner liner L being varied upon downward or upward movement of the parison controller 13 of the space adjusting means 12 on the basis of a predetermined program.

In interposition stage, the vertically movable fan-shaped member 16a located in the first stage S1 is moved upwardly to a predetermined position upon upward movement of the vertical rack 20 which is driven through the pinion gear 21 by rotation of the reversible pulse motor 22, and thereafter the cylindrical-shaped inner liner L is interpositioned between the green tire G and the bladder 30. When the lower end of the cylindrical-shaped inner liner L is seemed or assured to be attached to the upper surface of the movable fan-shaped member 16a, the movable fan-shaped member 16a is moved downwardly with a speed substantially equal to an extrusion speed of the cylindrical-shaped inner liner L. At this time, the cylindrical-shaped inner liner L is extruded in such a manner that the axial thickness of the axially mid portion thereof is thinner than that of the axially opposite end portions thereof by varying the space S between the elongated die member 8 and the doughnut-shaped die member 6 upon downward or upward movement of the parison controller 13 of the space adjusting means 12 on the basis of a predetermined program means.

In severing stage, fluid under pressure is first introduced into the hermetically sealed space R through the fluid passageway 31, and thereby expands radially and outwardly the axially mid portion of the bladder 30 to a predetermined amount. As a consequence, the cylindrical-shaped inner liner L interpositioned between the bladder 30 and the green tire G is urged radially and outwardly and held as shown in FIG. 5(c) upon the expansion of the bladder 30. Thereafter, the drive motor 36 is activated to drive the rotatable circular plate 38 to rotate on its axis. As a consequence, the pivotable cutter 39 is pivoted radially and outwardly of the rotatable circular 38 against the tension force of the tension coil spring 43 upon the rotation of the rotatable circular plate 38. Thus, the blade portion 41 of the pivotable cutter 39 protrudes radially and outwardly from the rotatable circular plate 38, thereby severing the cylindrical-shaped inner liner L from the inside. It is thus to be understood that the cylindrical-shaped inner liner L is severed to a predetermined length substantially equal to the axial length of the green tire G, and thinned at its axially mid portion.

In attachment stage, the vertically movable fan-shaped member 16a is first driven to move downwardly upon the downward movement of the vertical rack 20 which is driven through the pinion gear 22 by the rotation of the reversible pulse motor 22. Thereafter, fluid under pressure is introduced into the hermetically sealed space R through the fluid passageway 31, and thereby expands further the bladder 30 radially and outwardly. At this time, the axially mid portion of the bladder 30 is first expanded radially and outwardly due to the fact that the thickness T of the the axially mid portion of the bladder 30 is thinner than the thickness U of the axially opposite end portions of the bladder 30. As a consequence, even if the green tire G is in the form of a toroidal shape, the axially mid portion of the bladder 30 is first bonded to the inner surface of the green tire G as shown in FIG. 5(d). The bladder 30 is further expanded radially and outwardly to bond gradually the whole of the cylindrical-shaped inner liner L to the inner surface of the green tire G from the axially mid portion to the axially opposite end portions. In the case that the green tire G thus bonded with the cylindrical-shaped inner liner L is manufactured as a pneumatic tire, a defective joint of an inner liner does not occur in the tire as the cylindrical-shaped inner liner L does not have a joint portion. Further, in the present invention, the cylindrical-shaped inner liner L is not required to be stocked as being bonded to the green tire G immediately after the cylindrical-shaped inner liner L is extruded by the extruder 1. Accordingly, an additional space is not required for stocking the inner liner L. The air between the green tire G and the cylindrical-shaped inner liner L flows out through the air passageway 44 while the cylindrical-shaped inner liner L is bonding to the inner surface of the green tire G. Thus, the air is not enclosed within the green tire G and the cylindrical-shaped inner liner L by the reason that the cylindrical-shaped inner liner L is first bonded at its axially mid portion to the green tire G and thereafter gradually bonded from the axially mid portion thereof to the axially opposite end portions thereof. Furthermore, the cylindrical-shaped inner liner L thus bonded is most expanded at the axially mid portion but is even in axial thickness by the reason that the cylindrical-shaped inner liner L is thickened at its axially mid portion. In the prior art as described in the introductory part of this specification, a strip material of an even thickness for an inner liner is cut into a predetermined length. The inner liner having the predetermined is then wrapped around a tire building drum by a service and jointed at its longitudinal ends to be formed in a cylindrical shape, and thereafter the cylindrical-shaped inner liner is inflated into a toroidal shape. As a result, the median equatorial portion of the inner liner becomes thin. For this reason, the inner liner is required to have a relatively larger thickness as a whole than necessary. Next, fluid under pressure within the hermetically sealed space R is drawn through the fluid passageway 31 and thus the bladder 30 is shrinked to an initial state wherein fluid under pressure is not introduced.

In removal stage, the horizontally revolvable lower circular plate 15 is 120 degrees revolved in a horizontal plane in a direction directed by the arrow A as shown in FIG. 1. As a consequence, the green tire G on the movable fan-shaped member 16c is positioned in the first stage S1, and the green tire G bonded with the cylindrical-shaped inner liner L on the movable fan-shaped member 16a is positioned in the second stage S2, and further the empty 16b is positioned in the third stage S3. Next, in the first stage S1, the cylindrical-shaped inner liner L is bonded to the green tire G in a similar manner as described hereinbefore, and in the second stage S2, the movable fan-shaped member 16a supporting thereon the green tire G bonded with the cylindrical-shaped inner liner L is moved upwardly as shown in FIG. 5(e) and thereafter the green tire G bonded with the cylindrical-shaped inner liner L is removed by means of a suitable means. On the other hand, in the third stage S3, a new green tire G is placed on the empty fan-shaped member 16b by means of a suitable means. While there has been described one cycle of the operation of the tire building apparatus embodying the present invention, such cycles are repeated to produce consecutively the green tire G bonded with the cylindrical-shaped inner liner L. In case that an inner liner is required to have an axial length different from that of the inner liner L in the first embodiment, the above noted cycles may be repeated by changing only the cylindrical structure 27, the bladder 30, the rotatable shaft 33, the rotatable circular plate 38, and the program of the parison controller 13.

While it has been described that the green tire G is in the form of a toroidal shape, the bladder 30 may be even in axial thickness if the green tire G is in the form of a cylindrical shape, by the reason that since the bladder 30 is generally fixed at its axially opposite ends, the bladder 30 expands first at its axially mid portion, and thus the axially mid portion of the cylindrical-shaped inner liner L is first bonded to the inner surface of the green tire G. While it has been described that the vertically movable fan-shaped members 16a, 16b and 16c are movable toward and away from the extruder 1, the extruder 1 may be movable toward and away from the fan-shaped members 16a, 16b and 16c. Further, while it has been described that the bladder 30 and the severing assembly 32 are mounted through the cylindrical structure 27 on the vertically movable fan-shaped members 16a, 16b and 16c, the movable fan-shaped members 16a, 16b and 16c may be fixed and only the bladder 30 and the severing assembly 32 may be movable toward and away from the extruder 1. Furthermore, in the first embodiment, while it has been described that the doughnut-shaped die member 6 is fixed and the elongated die member 8 is axially movable, the doughnut-shaped die member 6 may be axially movable and the elongated die member 8 may be fixed.

Figure 6:
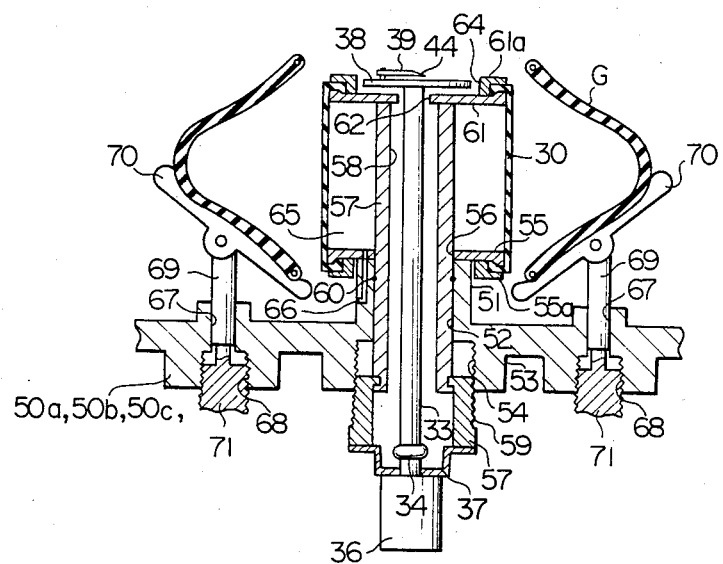
FIG. 6 is a view similar to FIG. 3 but showing a severing assembly and expanding means which are employed in a second preferred embodiment of the tire building apparatus according to the present invention.

Referring to FIG. 6, a second preferred embodiment embodying the present invention is shown. The description of the parts which correspond to the first embodiment will be omitted with the same reference numerals. In FIG. 6, vertically movable fan-shaped members forming part of the above-noted tire supporting means of the present invention are represented by the reference numerals 50a, 50b and 50c, respectively. In each of the fan-shaped members 50a, 50b and 50c is formed an upper boss portion 51 having an axial bore 52 passing therethrough and a lower boss portion 53 having an internally threaded bore 54 passing therethrough and disposed in vertical alignment with the bore 52. On the upper face of the upper boss portion 51 is interchangeably mounted a lower sealing circular member 55 the lower surface of which has mounted thereon a circular flange member 55a to hermetically seal the lower end portion of the above-noted bladder 30. The sealing circular member 55 has formed therein a bore 56 substantially equal to the bore 52 and disposed in vertical alignment with the bore 52 and the internally threaded bore 54. In the bore 52 of the upper boss portion 51 formed in each of the vertically movable fan-shaped members 50a, 50b, 50c, and the bore 56 of the lower sealing member 55 is slidably received a cylindrical structure 57 which has formed therein an axial bore 58 through which the above-noted rotatable shaft 33 passes. The circumferentially grooved lower end portion of the cylindrical structure 57 is secured to the circumferentially flanged upper end portion of a hollow adjusting screw 57 which has an externally threaded portion 59 fitted into the internally threaded bore 54 of the lower boss portion 53. On the lower face of the hollow adjusting screw 57 is rigidly mounted the above-noted bracket member 37 which is in turn rigidly mounted on the above-noted drive motor 36. An O-shaped ring indicated by the reference numeral 60 is provided to seal hermetically space between the cylindrical structure 57 and the bore 52 of the upper boss portion 51. On the other hand, on the upper face of the cylindrical structure 57 is interchangeably mounted an upper sealing circular member 61 formed at its center with a bore 62 through which the above-noted rotatable shaft 33 passes. On the upper surface of the upper circular member 61 is provided a circular flange member 61a to seal hermetically the upper end portion of the above-noted bladder 30. The circular flange member 61a has formed therein an opening 64 in which the above-noted rotatable circular plate 39 is disposed. It is thus to be understood that a hermetically sealed space 65 is defined within the inner surface of the bladder 30, the upper surface of the lower sealing circular member 55, the outer surface of the cylindrical structure 57 and the lower surface of the upper sealing circular member 61. On the other hand, in the upper boss portion 51 and the lower circular member 55 is formed an air passageway 66 one end of which is communicated with the hermetically sealed space 65 and the other end of which is communicated with the above-noted fluid source.

A plurality of bores 67 are formed in the upper portion of each of the movable fan-shaped members 50a, 50b and 50c, and equally disposed with one another from the center of the bore 52 of the upper boss portion 51. On the lower portion of each of the the movable fan-shaped members 50a, 50b and 50c are formed a plurality of an internally threaded bores 68 which are open to and in vertical alignment with the bores 67. The internally threaded bores 68 have pitches (for example half of the pitch of the internally threaded bore 54) smaller than that of the internally threaded bore 54 of the lower boss portion 53. A vertically slidable rod indicated by the reference numeral 69 is slidably received in the bore 67. The upper end of the vertically slidable rod 69 has rotatably carried thereon a support plate 70 to support the green tire G in the form of a toroidal shape. On the other hand, the lower end of the vertically slidable rod 69 is held in engagement with the upper end of an externally threaded adjusting screw 71 which is fitted into the internally threaded bore 68, by weights of the green tire G, the vertically slidable rod 69 and the support plate 70. It is thus to be understood that in the second embodiment, the lower and upper sealing circular members 55 and 61, respectively are interchangeable, and accordingly the above-noted bladder 30 is interchangeable, and further the vertically slidable rod 69 is slidable. Accordingly, in case that the cylindrical-shaped inner liner L is bonded to a green tire G having the same rim radius but a different axial length, the bonding of the inner liner L to the green tire G is easily done by changing only the above-noted bladder 30 and the program of the parison controller 13. Further, in case that the cylindrical-shaped inner liner L is bonded to a green tire G having a different rim radius, the bonding of the inner liner to the green tire G is easily done by changing only the above-noted sealing circular members 55 and 61. Furthermore, in the second embodiment, it is not required to provide the above-noted air passageway 44 to flow out the air between the green tire G and the bladder 30 by the reason that the support plates 70 are separated from each of the movable fan-shaped members 50a, 50b and 50c.

As previously described, according to the present invention, the inner liner is extruded in the form of a cylindrical shape by the extruder and thus does not have a joint portion. Accordingly, defective joints do not occur in the tire manufactured by using the tire building apparatus disclosed herein. Further, additional stock and space are not required by the fact that the extruded inner liner is bonded to the inner surface of the green tire immediately after it is extruded by the extruder. Furthermore, in case that tires are the same in rim radius but different in axial length, the production of the tires is easily done by changing only a severing length of the inner liner. And also, the inner liner bonded to the inner surface of the green tire is even in axial thickness by the reason that the thickness of the inner liner is quickly varied by means of the space adjusting means, and thereby reduces the expense of the material for the inner liner.

What is claimed is:

1. A tire building apparatus comprising:
an extruder having an extrusion die comprising a doughnut-shaped die member and an axially elongated die member to provide for consecutively extruding a cylindrical-shaped material downwardly from space between said doughnut-shaped die member and said axially elongated die member;
tire supporting means positioned under said extruder for supporting a green tire into which said cylindrical-shaped material is to be inserted, the supporting means being movable toward and away from said extruder and being revolvable in a horizontal plane with respect to said extruder;
expanding means mounted on said tire supporting means adapted to hold said cylindrical-shaped material from the inside of said green tire and to expand radially and outwardly said cylindrical-shaped material to bond to an inner surface of said green tire;
a severing assembly mounted on said tire supporting means for severing to a predetermined length said cylindrical-shaped material inserted into said green tire; and drive means adapted to drive said tire supporting means to move with respect to said extruder.

2. A tire building apparatus as set forth in claim 1, which further comprises space adjusting means which is adapted to adjust or change said space between said doughnut-shaped die member and said elongated die member by moving said elongated die member upwardly and downwardly with respect to said doughnut-shaped die member in such a manner that the thickness in an axial direction of said cylindrical-shaped material is adjusted or changed, and a holder member provided on said tire supporting means and adapted to support and maintain said green tire to be a substantially toroidal shape.

3. A tire building apparatus as set forth in claim 1, in which said tire supporting means comprises a horizontally revolvable lower circular plate and vertically movable upper fan-shaped members which are respectively disposed in opposite and alignedly spaced relation with said lower circular plate, said horizontally revolvable lower circular plate being intermittently 120 degrees revolvable in a horizontal plane, and in which said expanding means is constructed of a generally cylindrical bladder formed of a resilient material, said bladder being expanded and shrinked by means of fluid under pressure, and in which said severing assembly comprises a rotatable shaft rotatably connected to a drive motor, a rotatable circular plate securely mounted on an upper end of said rotatable shaft and a pivotable cutter pivotably mounted through a pivot pin on an upper surface of said rotatable circular plate, the pivotable cutter having a blade portion which is urged radially and inwardly of said rotatable circular plate by means of a tension coil spring, and in which said drive means comprises a plurality of vertical racks the upper ends of which are rigidly mounted on each of lower surfaces of said vertically movable fan-shaped members and passing through said horizontally revolvable lower circular plate, a plurality of pinion gears held in meshing engagement with said vertical racks and a plurality of reversible pulse motors mounted on said horizontally revolvable lower circular plate and carrying said pinion gears thereon.

4. A tire building apparatus as set forth in claim 2, in which said tire supporting means comprises a horizontally revolvable lower circular plate and vertically movable upper fan-shaped members which are respectively disposed in opposite and alignedly spaced relation with said lower circular plate, said horizontally revolvable lower circular plate being intermittently 120 degrees revolvable in a horizontal plane, and in which said expanding means is constructed of a generally cylindrical bladder formed of a resilient material, said bladder being expanded and shrinked by means of fluid under pressure, and in which said severing assembly comprises a rotatable shaft rotatably connected to a drive motor, a rotatable circular plate securely mounted on an upper end of said rotatable shaft and a pivotable cutter pivotably mounted through a pivot pin on an upper surface of said rotatable circular plate, the pivotable cutter having a blade portion which is urged radially and inwardly of said rotatable circular plate by means of a tension coil spring, and in which said drive means comprises a plurality of vertical racks the upper ends of which are rigidly mounted on each of lower surfaces of said vertically movable fan-shaped members and passing through said horizontally revolvable lower circular plate, a plurality of pinion gears held in meshing engagement with said vertical racks and a plurality of reversible pulse motors mounted on said horizontally revolvable lower circular plate and carrying said pinion gears thereon.

5. A tire building apparatus as set forth in claim 3, in which said bladder of said expanding means is thinned at its axially mid portion.

6. A tire building apparatus as set forth in claim 4, in which said bladder of said expanding means is thinned at its axially mid portion.

7. A tire building apparatus as set forth in claim 5, in which said holder member is movable with respect to said tire supporting means and said bladder is movable with respect to said tire supporting means, and in which said expanding means is interchangeable.

8. A tire building apparatus as set forth in claim 6, in which said holder member is movable with respect to said tire supporting means and said bladder is movable with respect to said tire supporting means, and in which said expanding means is interchangeable.

* * * * *